US010678281B2

(12) United States Patent
Wang et al.

(10) Patent No.: US 10,678,281 B2
(45) Date of Patent: Jun. 9, 2020

(54) CIRCUIT ARRANGEMENT FOR FILTERING AN ELECTRIC CURRENT

(71) Applicant: City University of Hong Kong, Kowloon (HK)

(72) Inventors: Kewei Wang, Beijing (CN); Shu Hung Henry Chung, Mid-levels (HK)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 15/045,607

(22) Filed: Feb. 17, 2016

(65) Prior Publication Data
US 2017/0237333 A1    Aug. 17, 2017

(51) Int. Cl.
*G05F 1/56*    (2006.01)
*G05F 1/565*    (2006.01)
*G05F 1/59*    (2006.01)
*H02M 1/00*    (2006.01)

(52) U.S. Cl.
CPC .............. *G05F 1/565* (2013.01); *G05F 1/59* (2013.01); *H02M 2001/0045* (2013.01)

(58) Field of Classification Search
CPC . H02M 2001/0045; H02M 2001/0087; H02M 3/156; H02M 3/158; G05F 1/462; G05F 1/563; G05F 1/565; G05F 1/59
See application file for complete search history.

(56) References Cited

U.S. PATENT DOCUMENTS

| 6,867,644 | B2* | 3/2005 | Taubman | H03F 3/08 327/562 |
| 2010/0329293 | A1* | 12/2010 | Taubman | B82Y 20/00 372/38.02 |
| 2014/0169049 | A1* | 6/2014 | Chandrasekaran | H02M 1/4225 363/84 |
| 2014/0191742 | A1* | 7/2014 | Kung | G05F 1/10 323/282 |
| 2015/0362933 | A1* | 12/2015 | Chung | H02M 3/156 323/266 |
| 2015/0364991 | A1* | 12/2015 | Chung | H02M 1/44 323/301 |

* cited by examiner

*Primary Examiner* — Fred E Finch, III
*Assistant Examiner* — Rafael O. De León Domenech
(74) *Attorney, Agent, or Firm* — Renner Kenner Greive Bobak Taylor & Weber

(57) ABSTRACT

A circuit arrangement for filtering an electric current, wherein the circuit arrangement is arranged between a power source providing the electric current and a load; and the electric current includes a first current component and a second current component. The circuit arrangement includes a first circuit arranged to receive and filter the first current component, a current control device arranged to receive and regulate the second current component so as to provide a regulated current to the load, and a control circuit arranged to provide a control signal to the current control device so as to control regulation of the second current component. The control circuit is further arranged to detect one or more operation parameters associated with the current control device, and to determine the control signal based on the one or more detected operation parameters.

20 Claims, 7 Drawing Sheets

CIRCUIT ARRANGEMENT FOR FILTERING AN ELECTRIC CURRENT

TECHNICAL FIELD

The present invention relates to a circuit arrangement for filtering an electric current, and more particularly, although not exclusively, to a power semiconductor filter circuit with a control mechanism adapted for dynamically regulating a frequency response of the filter circuit.

BACKGROUND

Electrical filters are typically used in a circuit for filtering a power signal. FIG. 1 is a circuit block diagram of an exemplary power electronic system 100, which includes an electrical filter 102 for an inverter application arranged between a switching network 104 and a load 106. In FIG. 1, the switching network 104 is a noise source that generates a power (e.g., voltage or current) waveform containing a wanted frequency component (e.g., 50 Hz) and other unwanted frequency components (e.g., 10 kHz, 20 kHz and 30 kHz). In order to provide power signal with only the wanted frequency component to the load 106, the electrical filter 102 placed between the switching network 104 and the load 106 is arranged to allow only the 50 Hz component to be transmitted to the load. The electrical filter 102 is arranged to substantially attenuate all other unwanted frequency components, preventing them from reaching the load 106. Ideally, for the wanted frequencies, the voltage and current outputted by the filter 102 should be the same as the voltage and current inputted to the filter 102. On the other hand, for the unwanted frequencies, the voltage and current outputted by the filter 102 should be zero.

Generally, simple electrical filters for power applications comprise only passive circuit components such as resistors, inductors and capacitors. The parameters of these components are chosen based on the required filter type (e.g., low-pass, high-pass, band-pass and band-stop) as well as the required performance criteria (e.g., cut-off frequencies, quality factors). Problems associated with this type of electrical filters include their relatively bulky size; their susceptibility to filter resonance, especially when the filter is of high order; their variable cut-off frequencies, primarily due to significant tolerance of the circuit components; and their inflexibility in terms of operation.

SUMMARY OF THE INVENTION

In accordance with a first aspect of the present invention, there is provided a circuit arrangement for filtering an electric current (or electric current signal), wherein the circuit arrangement is arranged between a power source providing the electric current and a load; and the electric current includes a first current component and a second current component, the circuit arrangement comprising: a first circuit arranged to receive and filter the first current component; a current control device arranged to receive and regulate the second current component so as to provide a regulated current to the load; and a control circuit arranged to provide a control signal to the current control device so as to control regulation of the second current component; wherein the control circuit is further arranged to detect one or more operation parameters associated with the current control device, and to determine the control signal based on the one or more detected operation parameters. The current to be filtered preferably includes only the first current component and the second current component. Also, the current to be filtered may include different frequency components—some of which are to be preserved, and some of which are to be filtered. The first circuit filters the first current component by preventing the first current component from reaching the load.

In one embodiment of the first aspect, the operation parameters associated with the current control device comprises at least one of: a voltage difference across the current control device, a magnitude of the second current component, and a frequency of the second current component. The operation parameters may further comprise a magnitude of the regulated current and/or a frequency of the regulated current.

In one embodiment of the first aspect, the control circuit comprises: a voltage control circuit having a voltage sensor arranged to detect a voltage difference across the current control device; and a voltage controller arranged to compare the detected voltage difference with a reference voltage value so as to determine the control signal; wherein the control signal is arranged to minimize a difference between the detected voltage difference and the reference voltage value.

In one embodiment of the first aspect, the voltage controller comprises an error amplifier.

In one embodiment of the first aspect, the voltage control circuit forms a closed loop.

In one embodiment of the first aspect, the reference voltage value is predetermined.

In one embodiment of the first aspect, the reference voltage value is dynamically adjustable. The frequency transfer characteristics of the circuit arrangement may thus be adjusted dynamically.

In one embodiment of the first aspect, the control circuit comprises: a current control circuit having a current sensor arranged to detect the second current component or the regulated current; and a current controller arranged to compare the detected current with a reference current value so as to determine the control signal; wherein the control signal is arranged to minimize a difference between the detected current and the reference current value. Preferably, the current sensor is arranged to detect the frequency component, for example an AC component, of the second current component or of the regulated current.

In one embodiment of the first aspect, the current controller comprises an error amplifier.

In one embodiment of the first aspect, the current control circuit is in the form of a closed loop.

In one embodiment of the first aspect, the reference current value is predetermined.

In one embodiment of the first aspect, the reference current value is dynamically adjustable. The frequency transfer characteristics of the circuit arrangement may thus be adjusted dynamically.

In one embodiment of the first aspect, the control signal comprises a first control signal component and a second control signal component; and the control circuit comprises: a voltage control circuit having a voltage sensor arranged to detect a voltage difference across the current control device; a voltage controller arranged to compare the detected voltage difference with a reference voltage value so as to determine the first control signal component; and a current control circuit having a current sensor arranged to detect the second current component or the regulated current; and a current controller arranged to compare the detected current with a reference current value so as to determine the second control signal component; wherein the first control signal component is arranged to minimize a difference between the detected voltage difference and the reference voltage value; and wherein the second control signal component is arranged to minimize a difference between the detected current and the reference current value. Preferably, the first control signal component is arranged to match the voltage difference across the current control device to the reference voltage value. Preferably, the second control signal component is arranged to match the second current component to the reference current value. The frequency transfer characteristics of the circuit arrangement may thus be adjusted dynamically.

In one embodiment of the first aspect, the current control device is connected in series between the power source and the load. The current control device may be connected upstream of load, or downstream of the load. The current control device may also be partly connected upstream of load and partly connected downstream of the load.

In one embodiment of the first aspect, the current control device is an active circuit device. In one example, the current control device is completely devoid of passive circuit elements.

In one embodiment of the first aspect, the current control device comprises a transistor. In one example, the current control device includes only a transistor, with no other circuit elements.

In one embodiment of the first aspect, the transistor comprises a field effect transistor or a bipolar junction transistor. Examples of these transistors include bipolar junction transistors (BJT), junction gate field-effect transistors (JFET), metal-oxide-semiconductor field-effect transistors (MOSFET), and hetero-structure field-effect transistors (HFET)/high-electron-mobility transistors (HEMT) that can be of any type (e.g., PNP, NPN) or channel (e.g., p-channel, n-channel), and can operate at different operation modes (e.g., depletion mode, enhancement mode).

In one embodiment of the first aspect, the transistor is a bipolar junction transistor, and the control signal is a base current of the bipolar junction transistor.

In one embodiment of the first aspect, the transistor is a field effect transistor, and the control signal is a gate-source voltage of the field effect transistor.

In one embodiment of the first aspect, the current control device comprises a transistor network with a plurality of transistors each arranged to receive a respective control signal from a control circuit. In one example, each transistor may receive a control signal from a respective control circuit. In another example, some transistors may receive a control signal form the same control circuit.

In one embodiment of the first aspect, the plurality of transistors are connected in parallel.

In one embodiment of the first aspect, the plurality of transistors are connected in series.

In one embodiment of the first aspect, the first circuit is a shunt circuit connected across the power source. The shunt circuit may comprise a circuit network having one or more capacitors, inductors, resistors, diodes, and other passive and active circuit elements.

In one embodiment of the first aspect, the shunt circuit is an active circuit. In one example, the shunt circuit is completely devoid of passive circuit elements.

In one embodiment of the first aspect, the shunt circuit is a passive circuit. In one example, the shunt circuit is completely devoid of active circuit elements.

In one embodiment of the first aspect, the shunt circuit comprises a capacitor.

In one embodiment of the first aspect, the first current component contains or is an unwanted frequency component of the current, and the second current component contains or is a wanted frequency component of the current. In one embodiment of the first aspect, the second current component and the regulated current have substantially identical frequency content. Preferably, only the wanted frequency component is transmitted to the load.

In one embodiment of the first aspect, the second current component and the regulated current have substantially identical magnitude. In other embodiments of the first aspect, their magnitude may be different.

In accordance with a second aspect of the present invention, there is provided a circuit arrangement for filtering an electric current (or electric current signal), wherein the circuit arrangement is arranged between a power source providing the electric current and a load; and the electric current includes a first frequency component and a second frequency component; the circuit arrangement comprising: a shunt circuit connected across the power source, the shunt circuit being arranged to receive and filter the first frequency component; a transistor circuit comprising at least one transistor, the transistor circuit being connected in series between the power source and the load, the transistor circuit being arranged to receive and regulate the second frequency component and to provide a regulated current to the load; and one or more control circuits arranged to provide a respective control signal to each of the at least one transistor so as to control regulation of the second frequency component; wherein each of the one or more control circuits is further arranged to detect one or more operation parameters associated with a respective one of the at least one transistor, and to determine the respective control signal based on the one or more detected operation parameters.

In one embodiment of the second aspect, the at least one transistor comprises a field effect transistor or a bipolar junction transistor. Examples of these transistors include BJT, JFET, MOSFET, HFET/HEMT that can be of any type (e.g., PNP, NPN) or channel (e.g., p-channel, n-channel), and can operate at different operation modes (e.g., depletion mode, enhancement mode).

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

Figure 1:
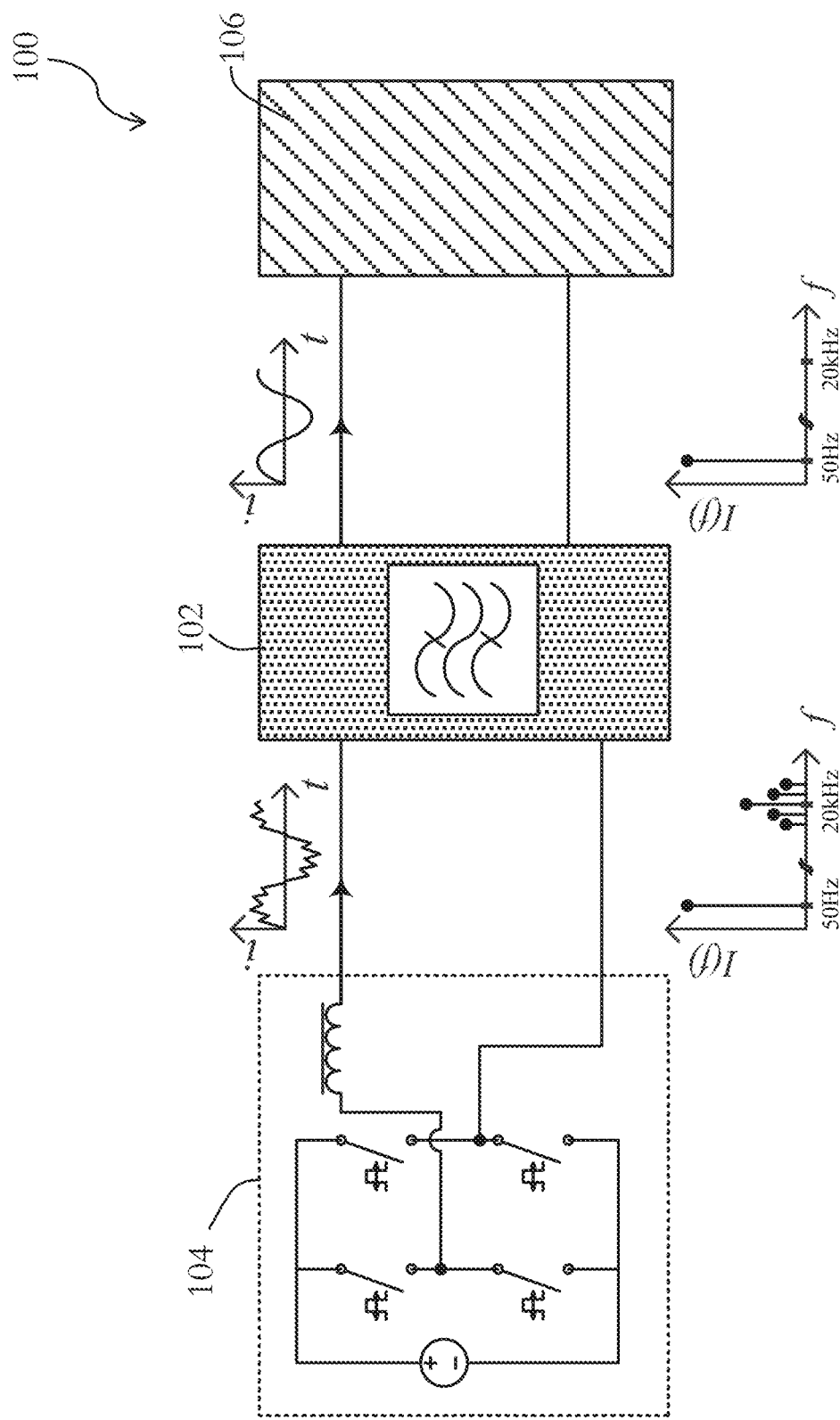
FIG. 1 is a circuit block diagram of an exemplary power electronic system illustrating the function of an electrical filter.
Figures 2, 3A:
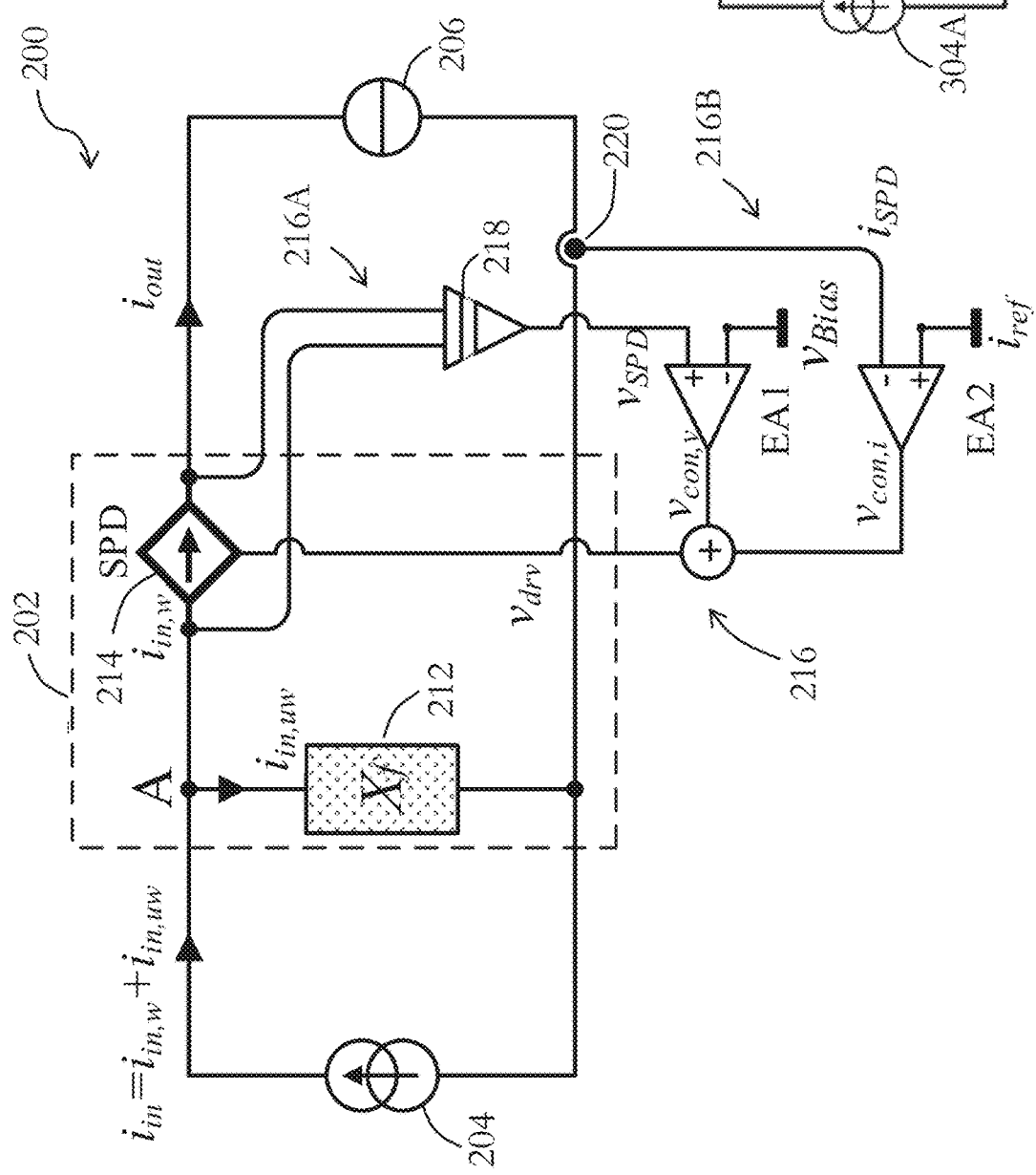
FIG. 2 is a circuit diagram showing a filter circuit arrangement for filtering a current, in accordance with one embodiment of the present invention.
FIG. 3A is a circuit diagram showing a generic structure of the filter circuit arrangement of FIG. 2.

Referring to FIG. 2, there is provided a circuit arrangement 202 for filtering an electric current, wherein the circuit arrangement 202 is arranged between a power source 204 providing the electric current and a load 206; and the electric current includes a first current component $i_{in,uw}(t)$ and a second current component $i_{in,w}(t)$, the circuit arrangement comprising: a first circuit 212 arranged to receive and filter the first current component $i_{in,uw}(t)$; a current control device 214 arranged to receive and regulate the second current component $i_{in,w}(t)$ so as to provide a regulated current $i_{out}(t)$ to the load 206; and a control circuit 216 arranged to provide a control signal $v_{drv}(t)$ to the current control device 214 so as to control regulation of the second current component $i_{in,w}(t)$; wherein the control circuit 216 is further arranged to detect one or more operation parameters associated with the current control device 214, and to determine the control signal $v_{drv}(t)$ based on the one or more detected operation parameters. The one or more operation parameters associated with the current control device 214 may comprise at least one of: a voltage difference across the current control device 214, a magnitude of the second current component $i_{in,w}(t)$, and a frequency of the second current component $i_{in,w}(t)$, a magnitude of the regulated current $i_{out}(t)$ and a frequency of the regulated current $i_{out}(t)$.

As shown in FIG. 2, the circuit 200 in accordance with an embodiment of the present invention includes a filter circuit arrangement 202 connected between a current source 204 and a load 206. The current source 204 is adapted to provide a current with DC and AC components. The filter circuit arrangement 202 is arranged to receive an input current $i_{in}(t)$ from the current source 204. The input current $i_{in}(t)$ may comprise a wanted current component $i_{in,w}(t)$ and an unwanted current component $i_{in,uw}(t)$. Preferably, the wanted current component $i_{in,w}(t)$ contains frequency component that is useful to the load 206. On the other hand, the unwanted current component $i_{in,uw}(t)$ contains frequency component that is not needed by the load 206 and hence needs to be filtered. The magnitude of the wanted current component $i_{in,w}(t)$ may be the same or may be different compared with that of the unwanted current component $i_{in,uw}(t)$.

The filter circuit arrangement 202 includes a shunt circuit 212 connected across the power source 204. In the present embodiment, the shunt circuit 212 is arranged to receive and hence to filter the unwanted current component $i_{in,uw}(t)$, thereby preventing it from reaching the load 206. The shunt circuit 212 may be a passive circuit or an active circuit, and it may be a circuit network having one or more of a capacitor, an inductor, a resistor, a diode, and other passive and active circuit elements. In one embodiment, the shunt circuit 212 is an active circuit that is completely devoid of passive circuit elements. In another embodiment, the shunt circuit 212 is a passive circuit that is completely devoid of active circuit elements.

The filter circuit arrangement 202 further includes a current control device 214 connected in series between the power source 204 and the load 206. In this embodiment, the current control device 214 is connected upstream of the load 206. However, in another embodiment, the current control device 214 may be connected downstream of the load 206, or may be connected partly upstream and partly downstream of the load 206. The current control device 214 is arranged to receive the wanted current component $i_{in,w}(t)$, regulate the wanted current component $i_{in,w}(t)$, and output a regulated current $i_{out}(t)$ to the load 206. The regulated current $i_{out}(t)$ and the wanted current component $i_{in,w}(t)$ may have substantially identical frequency content. The magnitude of the two may be the same or different. In the present invention, the current control device 214 is preferably an active circuit device. In one embodiment of the present invention, the current control device 214 comprises a transistor network having one or more transistors. The transistors may be a field effect transistor or a bipolar junction transistor. For example, the transistors may be bipolar junction transistors (BJT), junction gate field-effect transistors (JFET), metal-oxide-semiconductor field-effect transistors (MOSFET), and hetero-structure field-effect transistors (HFET)/high-electron-mobility transistors (HEMT) that can be of any type (e.g., PNP, NPN) or channel (e.g., p-channel, n-channel), and can operate at different operation modes (e.g., depletion mode, enhancement mode).

A control circuit 216 is preferably connected to the current control device 214. The control circuit 216 is arranged to provide a control signal $v_{drv}(t)$ to the current control device 214 so as to control regulation of the wanted current component $i_{in,w}(t)$. The control signal $v_{drv}(t)$ may be used to affect a magnitude or frequency of the regulated current $i_{out}(t)$ outputted by the current control device 214.

As shown in FIG. 2, in the present embodiment, the control circuit 216 includes a voltage control circuit 216A in the form of a closed loop. The voltage control loop 216A includes a voltage sensor 218, and a voltage controller in the form of an error amplifier EA1. Preferably, the voltage controller EA1 is used to regulate a DC operating point of the current control device 214. The voltage sensor 218 is arranged to detect a voltage difference $v_{SPD}(t)$ across the current control device 214. The voltage controller EA1 is arranged to compare the detected voltage difference $v_{SPD}(t)$ with a reference voltage value $v_{Bias}(t)$, and to derive and output a first control signal component $v_{con,v}(t)$. The first control signal component $v_{con,v}(t)$ is preferably arranged to alter an operation characteristic of the current control device 214 so as to minimize a difference between the detected voltage difference $v_{SPD}(t)$ and the reference voltage value $v_{Bias}(t)$. In one example, if the detected voltage difference $v_{SPD}(t)$ is larger than the reference voltage value $v_{Bias}(t)$, the first control signal component $v_{con,v}(t)$ will increase so as to decrease the detected voltage difference $v_{SPD}(t)$. If the detected voltage difference $v_{SPD}(t)$ is smaller than the reference voltage value $v_{Bias}(t)$, the first control signal component $v_{con,v}(t)$ will decrease so as to increase the detected voltage difference $v_{SPD}(t)$.

In a preferred embodiment, the reference voltage value $v_{Bias}(t)$ may be dynamically adjusted, and this allows the frequency transfer characteristics of the circuit arrangement 202 to be dynamically adjusted. However, in other embodiments, the reference voltage value $v_{Bias}(t)$ may be predetermined. Also, in the present embodiment, the reference voltage value $v_{Bias}(t)$ is chosen to be small so that the DC operating point of the current control device 214 is regulated at low voltage, and the power dissipation of the current control device 214 is minimized.

In the present embodiment, the control circuit 216 also includes a current control circuit 216B in the form of a closed loop. The current control loop includes a current sensor 220 and a current controller in the form of an error amplifier EA2. Preferably, the current controller EA2 is arranged to profile waveform of the regulated current $i_{out}(t)$. The current sensor 220 is arranged to detect the wanted current component $i_{in,w}(t)$ or the regulated current $i_{out}(t)$. In a preferred embodiment, the current sensor 220 is arranged to detect the frequency content of the wanted current component $i_{in,w}(t)$ or of the regulated current $i_{out}(t)$. The current controller EA1 is arranged to compare the detected current $i_{SPD}(t)$ with a reference current value $i_{ref}(t)$, and to derive and output a second control signal component $v_{con,i}(t)$. The second control signal component $v_{con,i}(t)$ is preferably arranged to alter an operation characteristic of the current control device so as to minimize a difference between the detected current $i_{SPD}(t)$ and the reference current value $i_{ref}(t)$. In one example, if the detected current $i_{SPD}(t)$ is larger than the reference current value $i_{ref}(t)$, the second control signal component $v_{con,i}(t)$ will decrease so as to reduce the detected current $i_{SPD}(t)$. If the detected current $i_{SPD}(t)$ is smaller than the reference current value $i_{ref}(t)$, the second control signal component $v_{con,i}(t)$ will increase so as to increase the detected current $i_{SPD}(t)$.

In a preferred embodiment, the reference current value $i_{ref}(t)$ may be dynamically adjusted, and this allows the frequency transfer characteristics of the circuit arrangement 202 to be dynamically adjusted. However, in other embodiments, the reference current value $i_{ref}(t)$ may be predetermined.

In the control circuit 216 of the present embodiment, the first control signal component $v_{con,v}(t)$ and the second control signal component $v_{con,i}(t)$ are summed to provide the control signal $v_{drv}(t)$.

Although in the present embodiment, the control circuit 216 includes both the voltage control loop 216A and the current control loop 216B, in other embodiments, the control circuit 216 may include only the voltage control loop 216A or only the current control loop 216B. In embodiments where the control circuit 216 only includes the voltage control loop 216A, the control signal $v_{drv}(t)$ comprises only the first control signal component $v_{con,v}(t)$ outputted by the voltage controller EA1. In embodiments where the control circuit 216 only includes the current control loop 216B, the control signal $v_{drv}(t)$ comprises only the second control signal component $v_{con,i}(t)$ outputted by the current controller signal component $v_{con,i}(t)$ outputted by the current controller EA2. A persons skilled in the art would appreciate that other methods and circuit constructions for matching the detected voltage difference $v_{SPD}(t)$ to the reference voltage value $v_{Bias}(t)$, and/or for matching the detected current $i_{SPD}(t)$ to the reference current value $i_{ref}(t)$ may be used.

FIG. 3A shows a generic structure of the filter circuit arrangement 302A similar to that of FIG. 2, without showing the control circuit. In FIG. 3A, the filter circuit arrangement 302A is arranged to receive the current $i_{in}(t)$ to be filtered from the power source 304A. The shunt circuit 312A in the filter circuit arrangement 302A is arranged to receive and filter the unwanted current component $i_{in,uw}(t)$. The current control device 314A is arranged to receive and regulate the wanted current component $i_{in,w}(t)$ and hence to provide a regulated current to a load (not shown). Note that although not shown, the current control device 314A in FIG. 3A is controlled by a control circuit as described with respect to FIG. 2.

FIGS. 3B to 3I show different detailed implements of the current control device in the filter circuit arrangement 202 of FIG. 2 in accordance with different aspects of the present invention. The current control devices 314B-314I in FIGS. 3B to 3I generally include a transistor network having one or more transistors. Each of the transistor is arranged to receive a respective control signal from a control circuit. In embodiments where there is more than one transistor, the transistors may be controlled by the same control circuit, or be controlled by a respective control circuit. In the present invention, the transistor may be a bipolar junction transistor or a field effect transistor. More particularly, the transistors may be bipolar junction transistors (BJT), junction gate field-effect transistors (JFET), metal-oxide-semiconductor field-effect transistors (MOSFET), and hetero-structure field-effect transistors (HFET)/high-electron-mobility transistors (HEMT) that can be of any type (e.g., PNP, NPN) or channel (e.g., p-channel, n-channel), and can operate at different operation modes (e.g., depletion mode, enhancement mode).

Figure 3B:
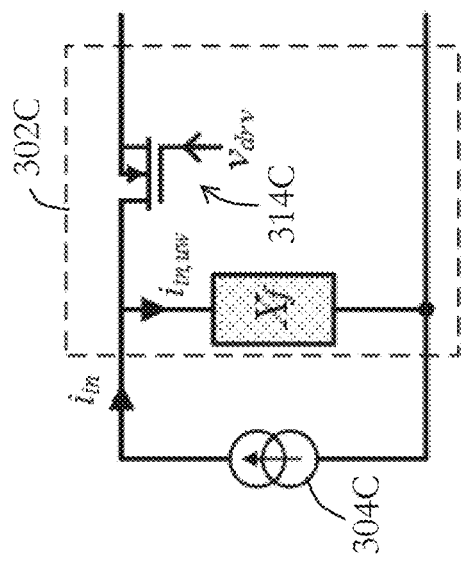
FIG. 3B is a circuit diagram showing a detailed implement of the filter circuit arrangement of FIG. 2 in accordance with a first embodiment of the present invention.

In the embodiment of FIG. 3B, the current control device is a p-channel MOSFET (p-MOSFET) 314B connected in series between the power source 304B and a load (not shown), upstream of the load. In this embodiment, the source terminal of the p-MOSFET is arranged to receive the wanted current component $i_{in,w}(t)$ and the drain terminal of the p-MOSFET is arranged to provide the regulated current $i_{out}(t)$ to the load. A control signal $v_{drv}(t)$ is provided as a gate-source voltage of the p-MOSFET, so as to control regulation of the wanted current component $i_{in,w}(t)$ and hence the magnitude and/or frequency of the regulated current $i_{out}(t)$.

Figure 3C:
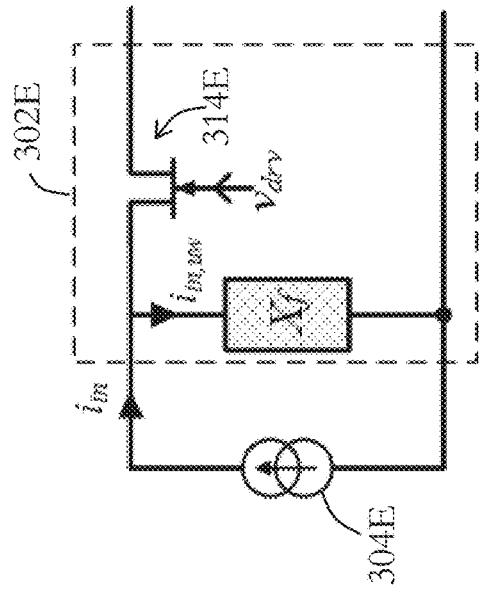
FIG. 3C is a circuit diagram showing a detailed implement of the filter circuit arrangement of FIG. 2 in accordance with a second embodiment of the present invention.

In the embodiment of FIG. 3C, the current control device is an n-channel MOSFET (n-MOSFET) 314C connected in series between the power source 304C and a load (not shown), upstream of the load. In this embodiment, the drain terminal of the n-MOSFET is arranged to receive the wanted current component $i_{in,w}(t)$, and the source terminal of the n-MOSFET is arranged to provide the regulated current $i_{out}(t)$ to the load. A control signal $v_{drv}(t)$ is provided as a gate-source voltage of the n-MOSFET, so as to control regulation of the wanted current component $i_{in,w}(t)$ and hence the magnitude and/or frequency of the regulated current $i_{out}(t)$.

Figure 3D:
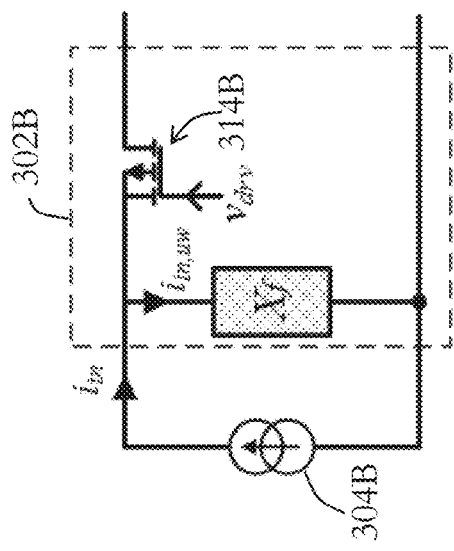
FIG. 3D is a circuit diagram showing a detailed implement of the filter circuit arrangement of FIG. 2 in accordance with a third embodiment of the present invention.

In the embodiment of FIG. 3D, the current control device is a NPN bipolar junction transistor (NPN BJT) 314D connected in series between the power source 304D and a load (not shown), upstream of the load. In this embodiment, the collector terminal of the NPN BJT is arranged to receive the wanted current component $i_{in,w}(t)$, and the emitter terminal of the NPN BJT is arranged to provide the regulated current $i_{out}(t)$ to the load. A control signal $v_{drv}(t)$ is provided as a base current of the NPN BJT, so as to control regulation of the wanted current component $i_{in,w}(t)$ and hence the magnitude and/or frequency of the regulated current $i_{out}(t)$.

Figure 3E:
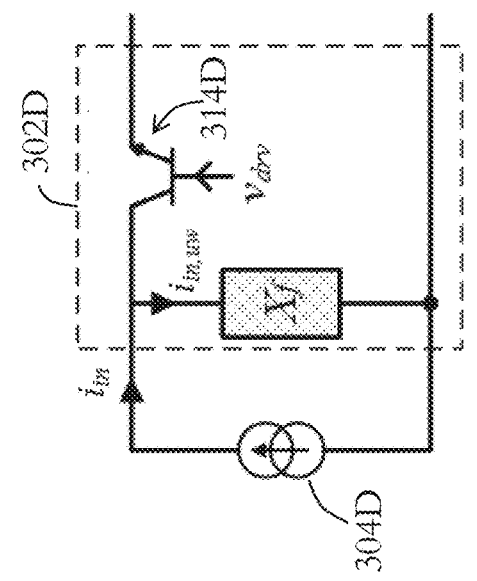
FIG. 3E is a circuit diagram showing a detailed implement of the filter circuit arrangement of FIG. 2 in accordance with a fourth embodiment of the present invention.
Figure 3F:
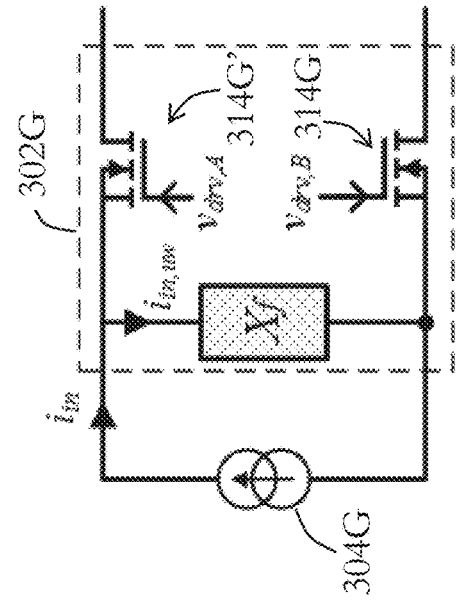
FIG. 3F is a circuit diagram showing a detailed implement of the filter circuit arrangement of FIG. 2 in accordance with a fifth embodiment of the present invention.

In the embodiment of FIG. 3E, the current control device is an re-channel junction gate field-effect transistor (n-JFET) 314E connected in series between the power source 304E and a load (not shown), upstream of the load. In this embodiment, the drain terminal of the n-JFET is arranged to receive the wanted current component $i_{in,w}(t)$, and the source terminal of the n-JFET is arranged to provide the regulated current $i_{out}(t)$ to the load. A control signal $v_{drv}(t)$ is provided as a gate-source voltage of the n-JFET, so as to control regulation of the wanted current component $i_{in,w}(t)$ and hence the magnitude and/or frequency of the regulated current $i_{out}(t)$.

Figure 3G:
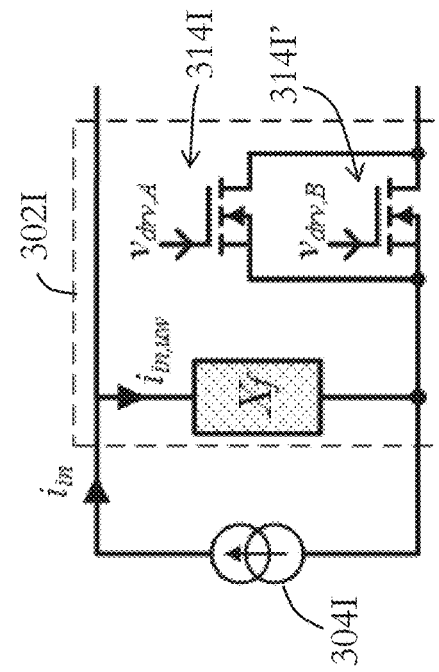
FIG. 3G is a circuit diagram showing a detailed implement of the filter circuit arrangement of FIG. 2 in accordance with a sixth embodiment of the present invention.
Figure 3H:
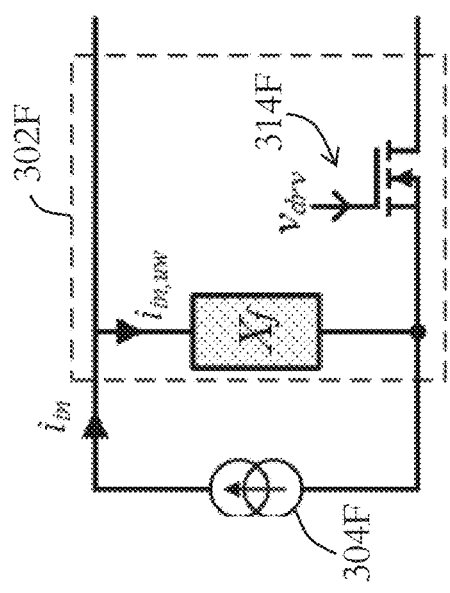
FIG. 3H is a circuit diagram showing a detailed implement of the filter circuit arrangement of FIG. 2 in accordance with a seventh embodiment of the present invention.
Figure 3I:
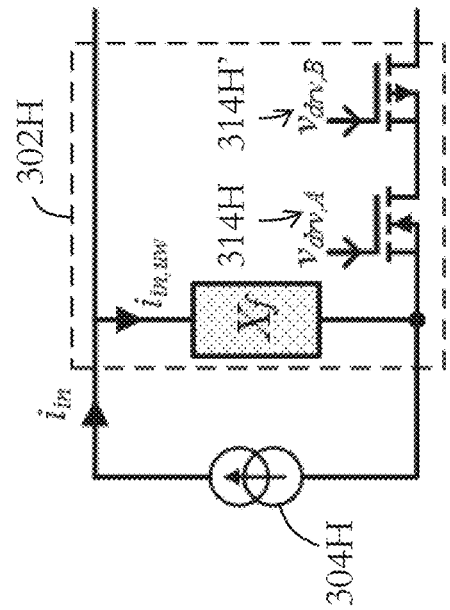
FIG. 3I is a circuit diagram showing a detailed implement of the filter circuit arrangement of FIG. 2 in accordance with an eighth embodiment of the present invention.

The current control device may also include different topologies, and may include different number of transistors. For example, in the embodiment of FIG. 3F, the current control device is an n-channel MOSFET (n-MOSFET) 314F connected in series between the power source 304F and the load (not shown), downstream of the load. In the embodiment of FIG. 3G, the current control device is a transistor network with two n-channel MOSFETs (n-MOSFET) 314G, 314G' connected in series between the power source 304G and a load (not shown). In this embodiment, one n-MOSFET 314G is connected upstream of the load, and another n-MOSFET 314G' is connected downstream of the load. In the embodiment of FIG. 3H, the current control device is a transistor network comprising a p-MOSFET 314H' and an n-MOSFET 314H connected in series between the power source 304H and a load (not shown). The transistor network in this embodiment is connected downstream of the load. In the embodiment of FIG. 3I, the current control device is a transistor network comprising two n-MOSFETs 314I, 314I' connected in parallel, between the power source 304I and a load (not shown). The transistor network in this embodiment is connected downstream of the load.

A person skilled in the art would appreciate that the current control device may comprise other transistors arrangements not illustrated in FIGS. 3B-3I. In FIGS. 3G-3I, each transistor in the transistor network is preferably controlled by a respective control circuit. However, in other embodiments, one control circuit may control two or more transistors in the transistor network.

Figure 4:
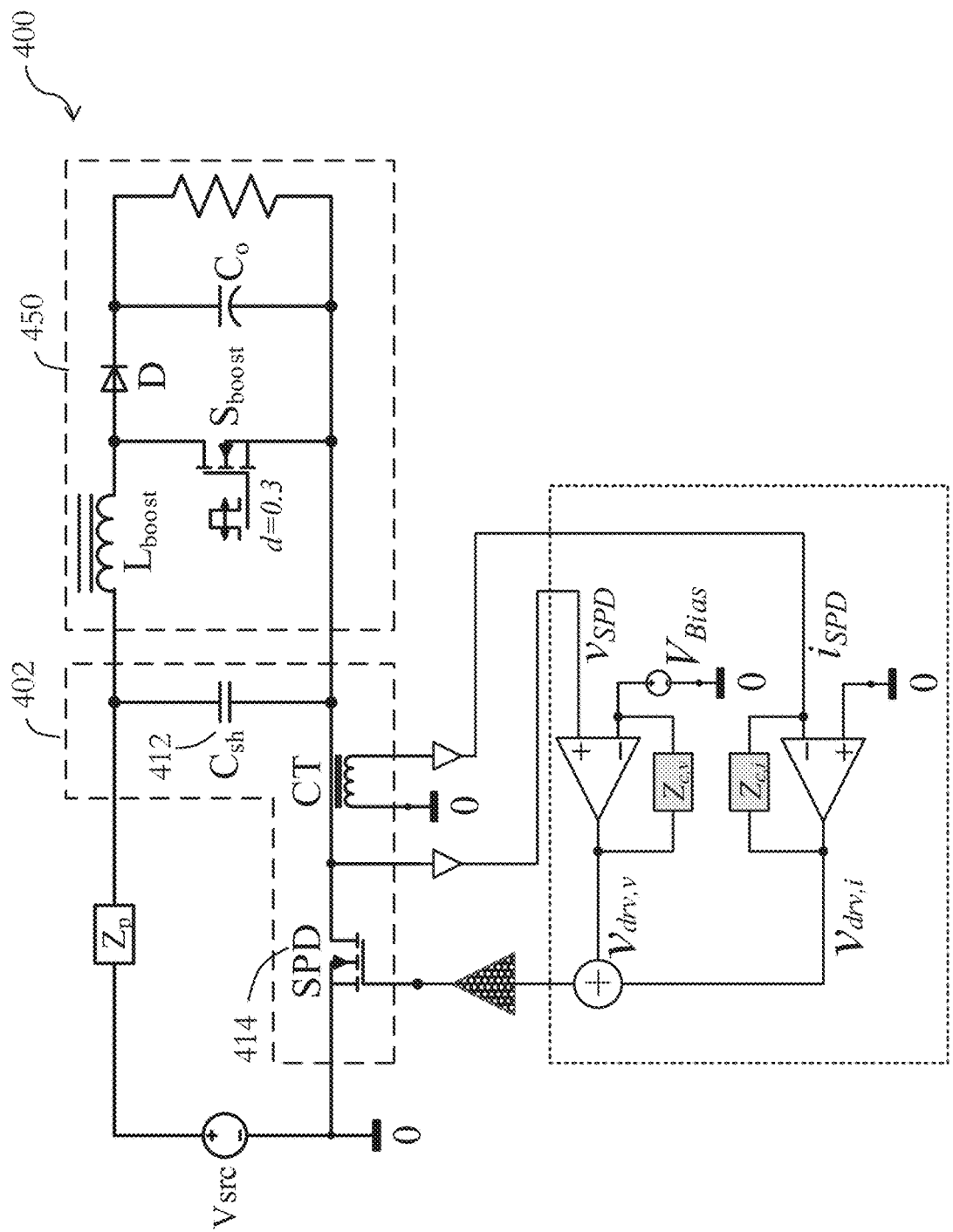
FIG. 4 is a circuit diagram showing a boost converter circuit incorporating a filter circuit arrangement in accordance with one embodiment of the present invention.

FIG. 4 is a boost DC-DC converter circuit 400 incorporating a filter circuit arrangement 402 in accordance with one embodiment of the present invention. In this embodiment, the boost converter 400 includes a switching network 450 that may be considered as a noise source, similar to the current source 204 that provides the current $i_{in}(t)$ in FIG. 2. The shunt circuit 412 in the filter circuit arrangement 402 includes a shunt capacitor $C_{sh}$, and the current control device 414 in the filter circuit arrangement 402 includes an n-MOSFET. The voltage difference across the current control device, $v_{SPD}(t)$, is sensed by a voltage sensor and a signal conditioning circuit. An error amplifier in the form of a proportional-plus-integral controller is arranged to compare the voltage difference $v_{SPD}(t)$ with a reference voltage value $V_{Bias}$, and to generate a first control signal $v_{drv,v}(t)$. An AC component of the current $i_{SPD}(t)$ is sensed using a miniaturized current transformer CT and a signal conditioning circuit. Another error amplifier in the form of a proportional controller is arranged to compare the detected current $i_{SPD}(t)$ with a reference current value $i_{ref}$, and to generate a second control signal $v_{drv,i}(t)$. The first and second control signals $v_{drv,v}(t)$ and $v_{drv,i}(t)$ are combined by a summing amplifier and the resulting control signal output is provided to the n-MOSFET to drive the n-MOSFET. In the present example, the main switch $S_{boost}$ in the converter is operated at 50 kHz and a duty cycle of 0.3. The reference voltage value $V_{Bias}$ is 1.3V and the reference current value $i_{ref}$ is 0V.

Figure 5:
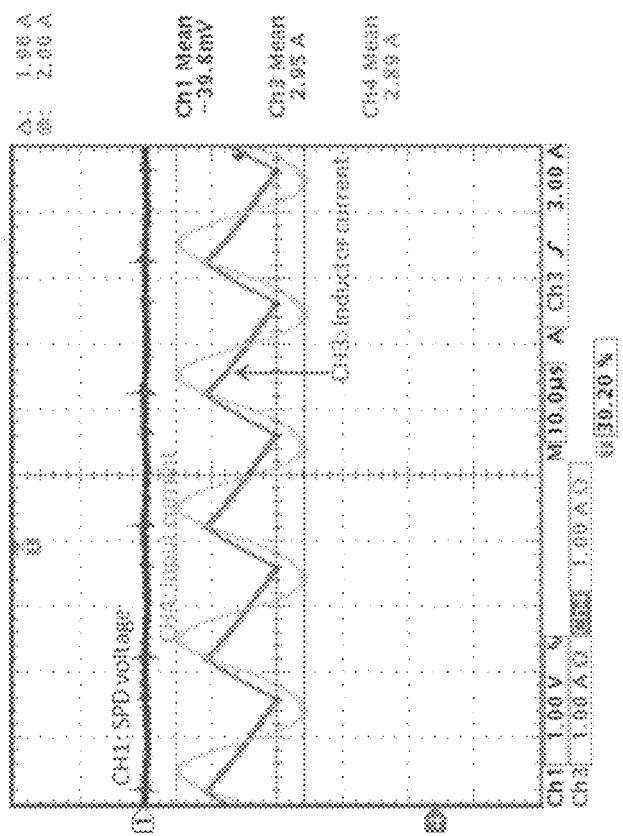
FIG. 5 is a graph showing waveforms measured in the boost converter circuit of FIG. 4 without the filter circuit arrangement.

FIG. 5 is a graph showing waveforms measured in the boost DC-DC converter circuit of FIG. 4 without the filter circuit arrangement. As shown in FIG. 5, the average inductor ($L_{boost}$) current CH3 and the average input current (inputted to the circuit arrangement 402) CH4 are both 2.9 A. The inductor current CH3 has a peak-to-peak magnitude of 1 A (fluctuate about the average value), and the ripple of the input current CH4 has a magnitude of 1.96 A (fluctuate about the average value). Due to the resonance of the input parasitic elements, such as the cable inductance, the input current CH4 has a significantly higher ripple compared with the inductor current CH3.

Figure 6:
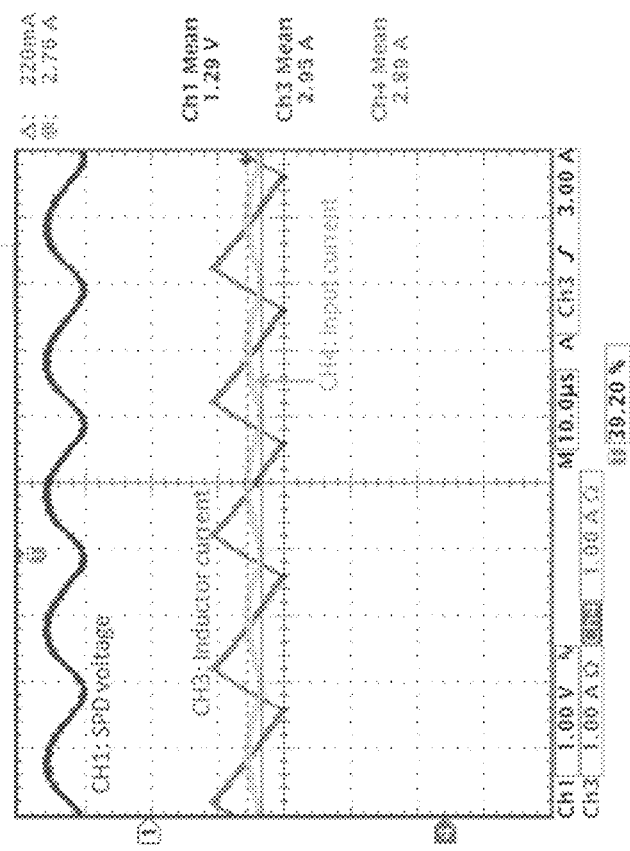
FIG. 6 is a graph showing waveforms measured in the boost converter circuit of FIG. 4 with the filter circuit arrangement.

FIG. 6 is a graph showing waveforms measured in the boost DC-DC converter circuit of FIG. 4 with the filter circuit arrangement. As shown in FIG. 6, the average inductor ($L_{boost}$) current CH3 and the average input current (inputted to the circuit arrangement 402) CH4 are both 2.9 A. The inductor current CH3 has a peak-to-peak magnitude of 1 A (fluctuate about the average value), and the ripple of the input current CH4 has a magnitude of 0.22 A (fluctuate about the average value). No resonance phenomena was observed in the input current CH4.

Figure 7:
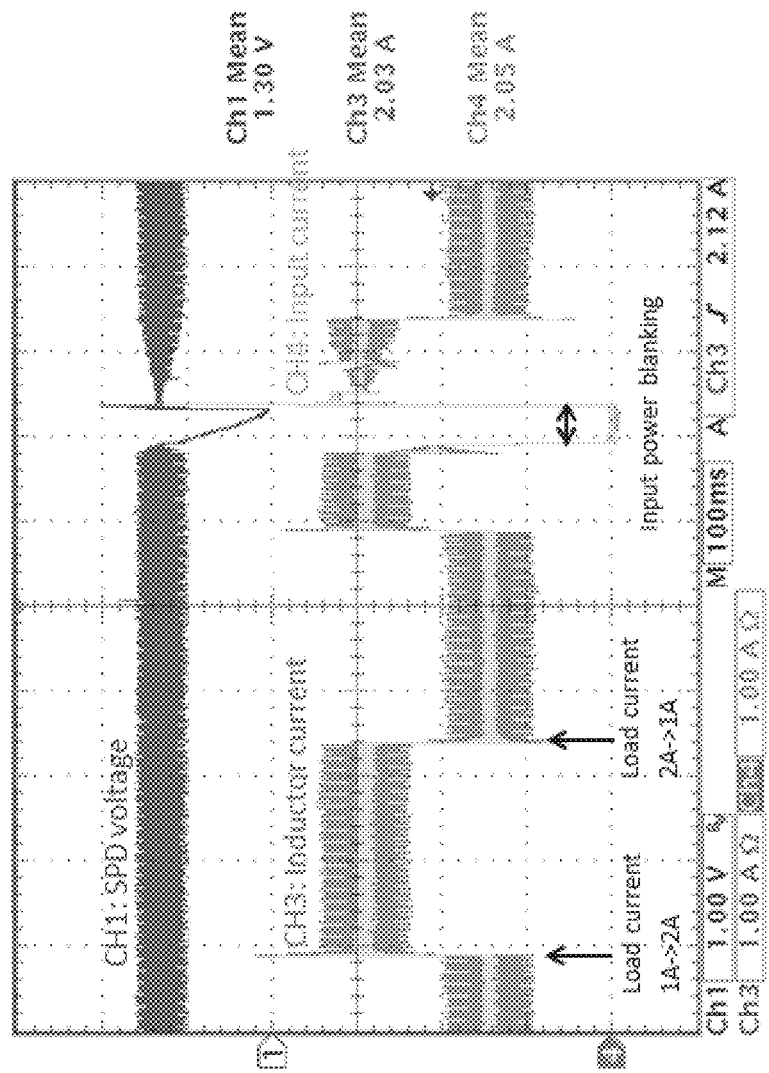
FIG. 7 is a graph showing transient response waveforms measured for the boost converter circuit of FIG. 4 with the filter circuit arrangement.

FIG. 7 is a graph showing transient response waveforms measured for the boost converter circuit of FIG. 4 with the filter circuit arrangement. As shown in FIG. 7, the current control device, i.e., the MOSFET, can rapidly respond to load transient whilst providing satisfactory of ripple suppression performance and stability. Upon encountering a power transient, the current control device also quickly converges to steady state without overstress.

Embodiments of the present invention have provided a standalone circuit arrangement, which consists of an active current control device with a closed loop control mechanism and a shunt circuit, for filtering and regulating an electric current. The filter circuit arrangement in the present invention is particularly advantageous when compared to conventional filters using passive components, as it provides a relatively simple and compact circuit arrangement. Advantageously, the circuit arrangement in the present invention also substantially avoids filter resonance, and allows the frequency transfer characteristics of the filter to be flexibly adjusted. Other advantages of the present invention in term of cost, function, structure, ease of manufacture, etc., would become apparent to a person skilled in the art upon studying the above detailed description and the accompanying drawings.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A filter circuit for filtering an electric current arranged to be provided from a power source to a converter, the electric current including a first current component having an unwanted frequency component and a second current component having a wanted frequency component, the filter circuit comprising:

a shunt circuit connected across the power source and arranged to receive and filter the first current component;

an active current control device arranged to suppress ripple in the second current component for providing a ripple-suppressed current to the converter; and a control circuit arranged to provide a control signal to the active current control device so as to control ripple suppression of the second current component, the control signal including a first control signal component and a second control signal component, wherein the control circuit comprises:

a voltage control circuit having:

a voltage sensor arranged to detect a voltage difference across the active current control device; and a voltage controller arranged to compare the detected voltage difference with a reference voltage value and to determine and provide the first control signal component to minimize a difference between the detected voltage difference and the reference voltage value;

a current control circuit having:

a current sensor arranged to detect the second current component or the ripple-suppressed current; and a current controller arranged to compare the detected current with a reference current value and to determine and provide the second control signal component to minimize a difference between the detected current and the reference current value; and an adder arranged to add the first control signal component and the second control signal component to form the control signal, and to provide the control signal to the active current control device;

wherein the voltage control circuit, the adder, and the active current control device are arranged in a first closed loop; and wherein the current control circuit, the adder, and the active current control device are arranged in a second closed loop different form the first closed loop.

2. The filter circuit in accordance with claim 1, wherein the voltage controller comprises an error amplifier.

3. The filter circuit in accordance with claim 1, wherein the reference voltage value is predetermined.

4. The filter circuit in accordance with claim 1, wherein the reference voltage value is dynamically adjustable.

5. The filter circuit in accordance with claim 1, wherein the current controller comprises an error amplifier.

6. The filter circuit in accordance with claim 1, wherein the reference current value is predetermined.

7. The filter circuit in accordance with claim 1, wherein the reference current value is dynamically adjustable.

8. The filter circuit in accordance with claim 1, wherein the active current control device is connected in series between the power source and the converter.

9. The filter circuit in accordance with claim 8, wherein the active current control device comprises a transistor.

10. The filter circuit in accordance with claim 9, wherein the transistor comprises a field effect transistor or a bipolar junction transistor.

11. The filter circuit in accordance with claim 10, wherein the transistor is a bipolar junction transistor, and the control signal is a base current of the bipolar junction transistor.

12. The filter circuit in accordance with claim 10, wherein the transistor is a field effect transistor, and the control signal is a gate-source voltage of the field effect transistor.

13. The filter circuit in accordance with claim 8, wherein the active current control device comprises a transistor network with a plurality of transistors each arranged to receive a respective control signal from the control circuit.

14. The filter circuit in accordance with claim 13, wherein the plurality of transistors are connected in parallel.

15. The filter circuit in accordance with claim 13, wherein the plurality of transistors are connected in series.

16. The filter circuit in accordance with claim 1, wherein the shunt circuit is an active circuit.

17. The filter circuit in accordance with claim 1, wherein the shunt circuit is a passive circuit.

18. The filter circuit in accordance with claim 1, wherein the shunt circuit comprises a capacitor.

19. The filter circuit in accordance with claim 1, wherein the current sensor comprises a current transformer.

20. The filter circuit in accordance with claim 1, wherein the control circuit arranged to directly provide the control signal to the active control device.

* * * * *